Patented Apr. 28, 1936

2,039,034

UNITED STATES PATENT OFFICE 2,039,034

ELECTRIC CONVERSION SYSTEM

Herbert A. Rose, Pittsburgh, and Daniel Silverman, Wilkinsburg, Pa., assignors to Westinghouse Electric & Manufacturing Company, East Pittsburgh, Pa., a corporation of Pennsylvania Application April 12, 1934, Serial No. 720,216

4 Claims. (Cl. 175—363)

Our invention relates to an electric conversion system and particularly to a transformer system for obtaining the effects of multiple phase operation.

In the operation of electrical converters such as mercury arc rectifiers, it has long been considered desirable to operate the converter with an effectively large number of phases so that the resulting ripple in the rectified voltage has a relatively high frequency, and consequently, is easily filtered out of the direct current circuit. The available alternating current circuits are usually three-phase and with these circuits it is a relatively simple matter to produce various types of effective six-phase potential for rectifier circuits.

It has heretofore been proposed to use various connections to secure higher multiples such as twelve-phase operation of the converters. The most satisfactory connection heretofore proposed for this purpose has been some of the so-called zig-zag connections. However, these require complicated winding systems in the transformer which are not only hard to balance magnetically, but also require very expensive bracing and other disadvantageous winding conditions.

It is an object of our invention to provide a rectifier system utilizing two or more of the simple winding connections to procure the effect of multi-phase operation. According to our invention, the rectifier transformer is provided with two substantially independent secondary windings which are so connected as to operate according to different modes of operation. For example, one of the secondaries may be connected to operate double-three-phase, while the other of the secondaries may be connected to operate triple-bi-phase.

In the operation of these two systems, the triple-bi-phase secondary will have its rectified voltage peaks in phase with the voltage generated in the transformer windings, while the double three-phase, because of the averaging effect of the inter-phase transformer, will have its rectified voltage peaks substantially 30° out of phase with the voltage generated in the transformer coils.

When the two rectified voltages are impressed on the direct-current system, the voltage peaks from one secondary are therefore intermediate the voltage peaks produced by the other secondary system, and consequently, produce instead of the six-phase ripple of either system, a twelve-phase or twelfth harmonic ripple which is much easier to filter out than the usual sixth harmonic ripple. Particularly is this the case for grid controlled rectifier systems where the effects of harmonic voltage in the output are of still greater importance.

Other objects and advantages of our invention will be apparent from the following detailed description taken in conjunction with the accompanying drawings, in which.

Figure 1:
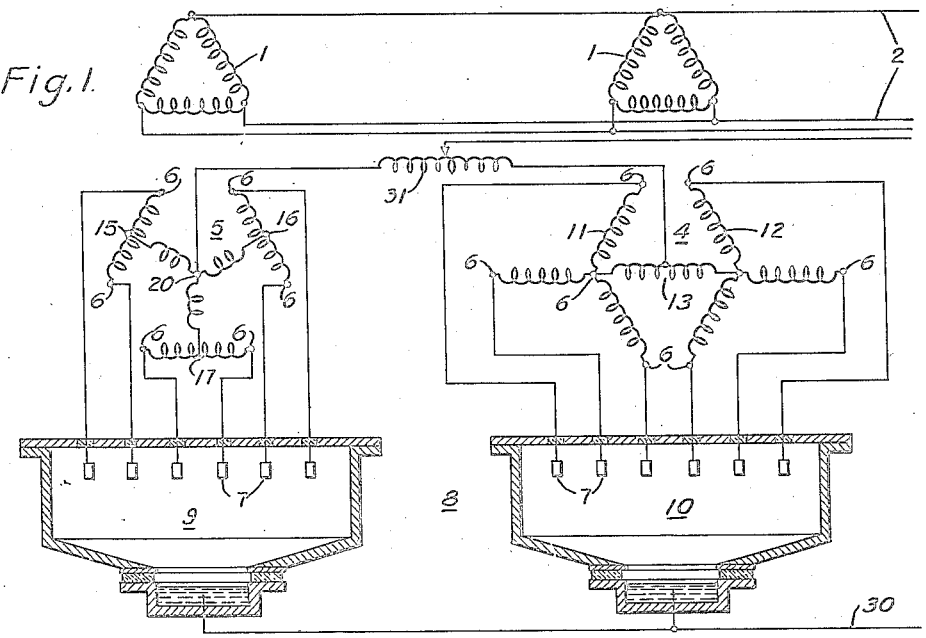
Figure 1 is a schematic illustration of a rectifier system embodying a preferred embodiment of our invention.

In the preferred embodiment of our invention, as disclosed in Fig. 1, the rectifier system comprises a suitable transformer having a delta-connected primary 1 connected to the three-phase alternating-current system 2, and a plurality of secondaries 4 and 5 asociated with the primary 1. Each of the secondaries 4 and 5 is provided with six-phase terminals 6 adapted to be connected to the valves 7 of a converter such as a mercury arc rectifier 8. While all twelve of these valves may be incorporated in a single converter chamber we prefer to sectionalize the converter and to put the valves 7, connected to one of the secondaries, in a separate converter tank 9—10 from the valves 7 connected to the other secondary. It has been found to be mechanically much easier to construct relatively small six valve rectifiers than the larger twelve-valve type. Also, there is a distinct advantage in that, in an emergency, either section can be operated independently of the other section.

In our preferred embodiment one of the secondaries 4 is provided with two star-connected groups 11 and 12 interconnected by a suitable inter-phase winding 13, to produce the so-called double three-phase type of winding. The other secondary 5 is provided with three substantially single-phase windings 15, 16 and 17 interconnected by a suitable three-legged inter-phase connection 20 to produce triple-bi-phase operation. For either connection, the phase windings of the secondaries 4 and 5 are of the simple type and associated directly with one leg of the primary winding 1.

While we prefer to utilize parallel primary windings 1 and associate each of the secondary windings 4 and 5 with one of the parallel primary sections, there may be occasions when it is desirable to utilize a single primary winding section and associate the secondary windings 4 and 5 with the single primary section.

In the operation of our conversion system the output voltage of the double three-phase section 4 will have a ripple whose peak voltages 25 are substantially intermediate between the peak voltages 26 generated in the transformer windings, while the triple-bi-phase section 5 has a peak voltage 28 substantially in phase with the voltages 26 generated in the transformer windings. Since these out of phase ripples are simultaneously impressed on the direct-current system, the ripple in the direct-current system will be composed of the two superimposed ripples 25 and 28, and consequently, substantially a twelve-phase ripple. This ripple may be further modified by connecting an auxiliary inter-phase winding 31 between the two sections of the secondary winding. This auxiliary inter-phase winding 31 serves to average the instantaneous difference in potential between the sections 4 and 5 caused by the different modes of operation thereof to produce the ripple 32. Since the direct-current voltages obtained by these different methods of operation are substantially different, it is necessary to provide the separate secondary windings 4 and 5 with a turn ratio such that the rectified output voltages 25 and 28 are substantially equal.

Figure 2:
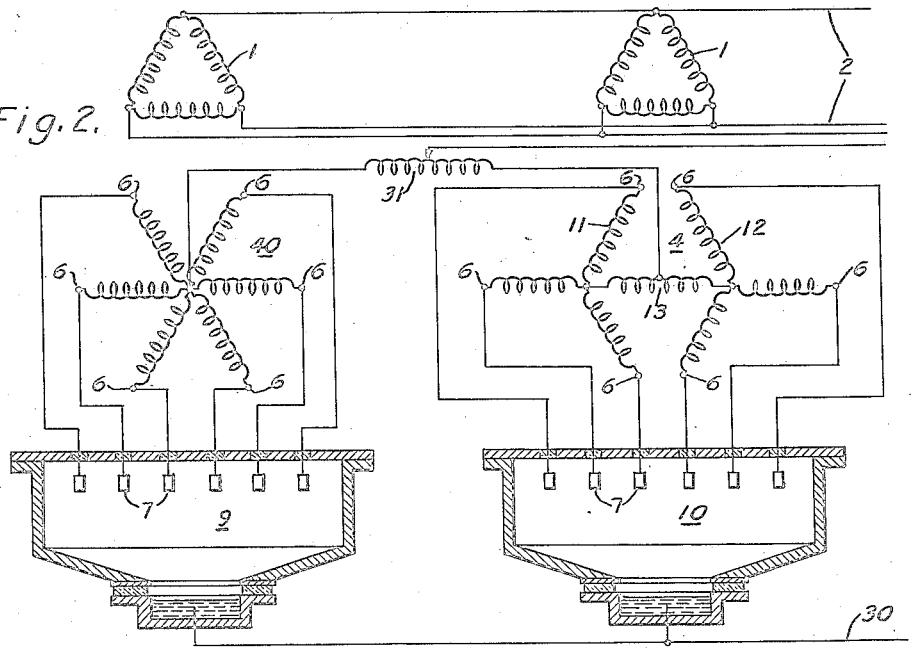
Fig. 2 is a similar illustration of a system for securing substantially the same harmonic output.

As indicated in Fig. 2, the triple-bi-phase winding 5 may be replaced by the six-phase diametrical winding 40, the resulting voltage ripple being substantially identical in either case. However, because of the better utilization of the transformer windings when operated according to the triple-bi-phase connection, it will generally be preferable to utilize the triple-bi-phase connection.

Figure 3:
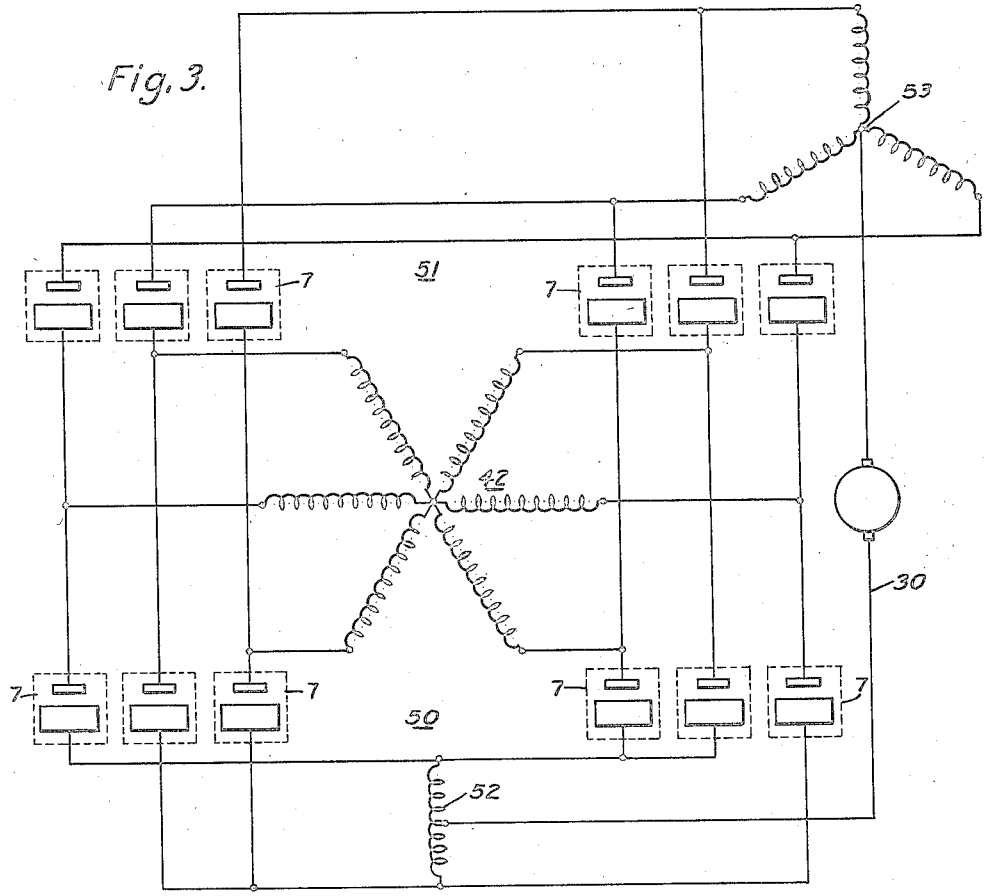
Fig. 3 is a schematic illustration of a rectifier system in which the utilization of the supply transformer is greatly increased.
Figure 4:
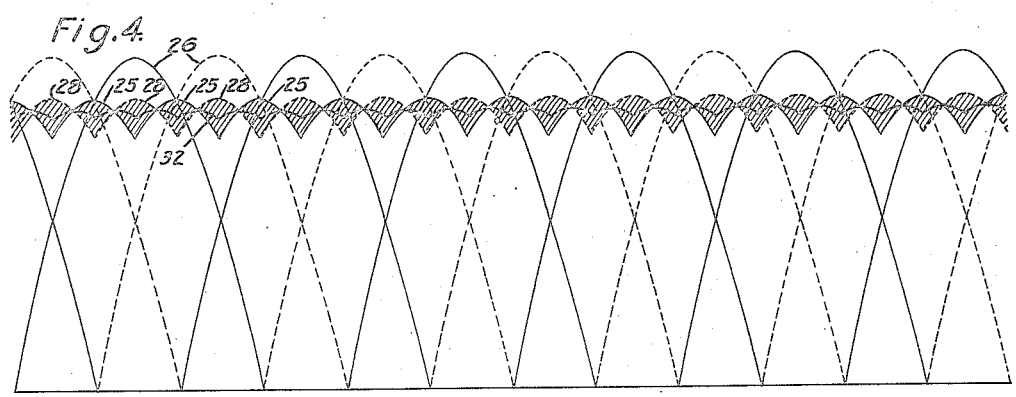
Fig. 4 is a diagrammatic illustration of the voltage characteristics obtained by our system of connections.

In the modification according to Fig. 3, the twelve valves 7 of the conversion system are of the single-anode, single-cathode variety, having the anodes and cathodes each insulated from the other. By using the single type valve it is possible to utilize a single secondary system 42 to feed current to all of the valves 7, thus resulting in a highly desirable utilization of the transformer winding. According to this modification, the secondary 42 of the transformer is a single six-phase diametrical connection with each of the terminals 6 connected to two valves 7. These valves are divided into two oppositely directed groups 50 and 51, one of the groups 50 being connected into two groups having three valves and the two groups interconnected by a suitable inter-phase winding 52, so that this group of valves operates according to a double-three-phase mode of operation, while the other group of valves 51 is connected into three groups of two valves each and inter-connected by a suitable inter-phase winding 53 in such manner that this group of valves operates triple-bi-phase. Obviously, the triple-bi-phase group could be operated six-phase diametrical to produce the same ultimate voltage output. However, when the two valve systems operate double-three-phase and triple-bi-phase each phase winding of the transformer is constantly delivering current to one or the other of the valve systems 50 or 51 so that the utilization of the transformer winding 42 is approximately complete. The difference in potential between the different modes of operation is immaterial when the load 30 is connected in series as illustrated. However, if it is desired to have the two output voltages substantially equal, the double three-phase system can be connected by suitable taps (not shown) so as to receive a reduced voltage from the transformer winding 42.

While we have shown and described specific system connections, it will be apparent that changes and modifications can be made therein without departing from the true spirit of our invention or the scope of the appended claims.

We claim as our invention:

1. A rectifier system for securing effective twelve-phase operation, comprising twelve electric valves arranged to provide two valve groups, a transformer for supplying energy to said valves, an interphase winding associated with one of said valve groups to induce double-three-phase operation of said group, a second interphase winding associated with the other valve group for securing triple-bi-phase operation thereof.

2. A rectifier system for securing effective twelve-phase operation comprising a transformer, a three-phase primary winding assembly in said transformer, a plurality of secondary windings associated with said primary winding assembly, one of said secondaries being connected for double three-phase operation and the other connected for triple-bi-phase operation, an interphase transformer being connected between said secondary windings for absorbing the instantaneous voltage differences caused by the different methods of operation, a vapor-electric converter fed by said transformer and a direct-current system connected to the converter and to said interphase transformer.

3. A transformer for securing effective twelve-phase operation of vapor electric converters, comprising a three-phase primary winding assembly, two secondary windings, each having six phase terminals, associated with said primary winding assembly, one of said secondary windings being arranged for double three-phase operation, and the other for triple-bi-phase operation and an auxiliary winding connected between said secondary windings.

4. An electrical conversion system for securing effective twelve-phase operation comprising a three-phase supply circuit, a transformer having two substantially similar parallel primary winding sections, two substantially independent secondary windings each associated respectively with one of said primary winding sections, each of said secondary windings having six phase windings, an independent interphase winding associated with each of said secondary windings for controlling the mode of operation thereof, said interphase windings being of different types so that each of said secondary windings operates according to a different mode, a vapor electric converter fed by said windings and an auxiliary winding for averaging the voltage differences resulting from said different modes of operation.

HERBERT A. ROSE.
DANIEL SILVERMAN.